United States Patent
Duddles et al.

(10) Patent No.: US 10,425,667 B2
(45) Date of Patent: Sep. 24, 2019

(54) NETWORK LAYER TRANSPORT OF VIDEO CHARACTERISTICS FOR USE BY NETWORK FUNCTION IN A SERVICE FUNCTION CHAIN

(71) Applicant: CISCO TECHNOLOGY, INC., San Jose, CA (US)

(72) Inventors: Matthew Duddles, San Jose, CA (US); Sebastian Jeuk, San Jose, CA (US); Gonzalo Salgueiro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 66 days.

(21) Appl. No.: 15/284,073

(22) Filed: Oct. 3, 2016

(65) Prior Publication Data

US 2018/0098104 A1    Apr. 5, 2018

(51) Int. Cl.

| | |
|---|---|
| *H04N 7/20* | (2006.01) |
| *H04N 21/236* | (2011.01) |
| *H04L 29/08* | (2006.01) |
| *H04L 29/06* | (2006.01) |
| *H04N 21/643* | (2011.01) |
| *H04N 21/83* | (2011.01) |
| *H04N 21/234* | (2011.01) |

(52) U.S. Cl.
CPC ....... *H04N 21/23605* (2013.01); *H04L 67/02* (2013.01); *H04L 67/42* (2013.01); *H04L 69/329* (2013.01); *H04N 21/234* (2013.01); *H04N 21/64322* (2013.01); *H04N 21/83* (2013.01)

(58) Field of Classification Search
None
See application file for complete search history.

(56) References Cited

U.S. PATENT DOCUMENTS

| | | | | |
|---|---|---|---|---|
| 5,550,825 | A | * | 8/1996 | McMullan, Jr. ....... H04H 20/30 348/E7.049 |
| 6,286,052 | B1 | * | 9/2001 | McCloghrie ........ H04L 41/0893 370/235 |
| 6,651,135 | B2 | * | 11/2003 | Ando ................. G11B 20/1883 711/112 |
| 8,441,955 | B2 | | 5/2013 | Wilkinson et al. |
| 9,300,585 | B2 | | 3/2016 | Kumar et al. |
| 9,331,944 | B2 | * | 5/2016 | Swenson ................. H04L 47/11 |
| 9,385,950 | B2 | | 7/2016 | Quinn et al. |
| 9,634,936 | B2 | * | 4/2017 | Bansal .................... H04L 45/30 |

(Continued)

FOREIGN PATENT DOCUMENTS

WO    WO 2016038139 A1 *    3/2016    ......... H04L 41/0893

OTHER PUBLICATIONS

IETF RFC 7665, "Service Function Chaining (SFC) Architeture", J. Halpern et al., Oct. 2015.

(Continued)

*Primary Examiner* — Jason P Salce
(74) *Attorney, Agent, or Firm* — Cindy Kaplan

(57) ABSTRACT

In one embodiment, a method includes identifying at a network device, a characteristic of a video processed by a video service operating at an application layer, inserting the video characteristic into a header of a packet at the network device, and transmitting the packet on a service function path comprising a network function operable to use the video characteristic at a network layer. An apparatus and logic are also disclosed herein.

18 Claims, 6 Drawing Sheets

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver|O|C|R|R|R|R|R|R|   Length   |  MD-type=0x2  | Next Protocol |
+-+-+-+-+-+-+-+-+-+-+-+-+-+-+-+-+-+-+-+-+-+-+-+-+-+-+-+-+-+-+-+-+
|          Service Path Identifier            | Service Index  |
+-+-+-+-+-+-+-+-+-+-+-+-+-+-+-+-+-+-+-+-+-+-+-+-+-+-+-+-+-+-+-+-+
|                                                               |
~     Variable Length Context Headers  (Video Specific Fields)  ~
|                                                               |
+-+-+-+-+-+-+-+-+-+-+-+-+-+-+-+-+-+-+-+-+-+-+-+-+-+-+-+-+-+-+-+-+
        60
```

(56) References Cited

U.S. PATENT DOCUMENTS

| | | | |
|---|---|---|---|
| 2004/0037317 A1* | 2/2004 | Zalitzky | H04B 3/54 370/466 |
| 2009/0327842 A1* | 12/2009 | Liu | H04L 1/0057 714/776 |
| 2014/0362682 A1* | 12/2014 | Guichard | H04L 41/5038 370/221 |
| 2015/0039680 A1* | 2/2015 | Gallant | H04L 65/60 709/203 |
| 2015/0052571 A1* | 2/2015 | Stokking | H04N 21/242 725/116 |
| 2015/0200750 A1* | 7/2015 | Lu | H04L 1/1671 370/252 |
| 2015/0222640 A1* | 8/2015 | Kumar | H04L 47/125 370/230 |
| 2015/0269383 A1* | 9/2015 | Lang | G06F 21/57 726/1 |
| 2015/0281173 A1* | 10/2015 | Quinn | H04L 61/2507 709/245 |
| 2015/0365322 A1* | 12/2015 | Shatzkamer | H04L 45/74 370/392 |
| 2016/0021161 A1* | 1/2016 | Viswanathan | H04L 65/80 709/219 |
| 2016/0080253 A1* | 3/2016 | Wang | H04L 12/6418 370/392 |
| 2016/0173373 A1 | 6/2016 | Guichard et al. | |
| 2016/0205015 A1* | 7/2016 | Halligan | H04L 45/56 370/400 |
| 2016/0261495 A1* | 9/2016 | Xia | H04L 45/58 |
| 2016/0294664 A1* | 10/2016 | Manghirmalani | H04L 43/12 |
| 2016/0323193 A1* | 11/2016 | Zhou | H04L 12/6418 |
| 2016/0330111 A1* | 11/2016 | Manghirmalani | H04L 43/028 |
| 2017/0078176 A1* | 3/2017 | Lakshmikantha | H04L 43/0852 |
| 2017/0093658 A1* | 3/2017 | Ryan | H04L 43/067 |
| 2017/0126792 A1* | 5/2017 | Halpern | H04L 41/0896 |
| 2017/0250869 A1* | 8/2017 | Voellmy | H04L 41/0893 |
| 2017/0272367 A1* | 9/2017 | Kozat | H04L 47/50 |
| 2017/0300352 A1* | 10/2017 | Lou | G06F 9/45558 |

OTHER PUBLICATIONS

IETF Draft "Network Servvice Header", (draft-quinn-sfc-nsh.07.txt), P. Quinn et al., Feb. 24, 2015.

* cited by examiner

```
 0  1  2  3  4  5  6  7  8  9  0  1  2  3  4  5  6  7  8  9  0  1  2  3  4  5  6  7  8  9  0  1
+-+-+-+-+-+-+-+-+-+-+-+-+-+-+-+-+-+-+-+-+-+-+-+-+-+-+-+-+-+-+-+-+
|Ver|O|C|R|R|R|R|R|R|    Length    |  MD-type=0x1  | Next Protocol |
+-+-+-+-+-+-+-+-+-+-+-+-+-+-+-+-+-+-+-+-+-+-+-+-+-+-+-+-+-+-+-+-+
|         Service Path Identifier                  | Service Index|
+-+-+-+-+-+-+-+-+-+-+-+-+-+-+-+-+-+-+-+-+-+-+-+-+-+-+-+-+-+-+-+-+
|         Mandatory Context Header (Video Specific Fields)       |
+-+-+-+-+-+-+-+-+-+-+-+-+-+-+-+-+-+-+-+-+-+-+-+-+-+-+-+-+-+-+-+-+
|         Mandatory Context Header (Video Specific Fields)       |
+-+-+-+-+-+-+-+-+-+-+-+-+-+-+-+-+-+-+-+-+-+-+-+-+-+-+-+-+-+-+-+-+
|         Mandatory Context Header (Video Specific Fields)       |
+-+-+-+-+-+-+-+-+-+-+-+-+-+-+-+-+-+-+-+-+-+-+-+-+-+-+-+-+-+-+-+-+
|         Mandatory Context Header (Video Specific Fields)       |
+-+-+-+-+-+-+-+-+-+-+-+-+-+-+-+-+-+-+-+-+-+-+-+-+-+-+-+-+-+-+-+-+
      50
```

FIGURE 5

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver|O|C|R|R|R|R|R|R|   Length    |  MD-type=0x2  | Next Protocol |
+-+-+-+-+-+-+-+-+-+-+-+-+-+-+-+-+-+-+-+-+-+-+-+-+-+-+-+-+-+-+-+-+
|          Service Path Identifier              | Service Index |
+-+-+-+-+-+-+-+-+-+-+-+-+-+-+-+-+-+-+-+-+-+-+-+-+-+-+-+-+-+-+-+-+
|                                                               |
~     Variable Length Context Headers  (Video Specific Fields)  ~
|                                                               |
+-+-+-+-+-+-+-+-+-+-+-+-+-+-+-+-+-+-+-+-+-+-+-+-+-+-+-+-+-+-+-+-+
         60
```

FIGURE 6

NETWORK LAYER TRANSPORT OF VIDEO CHARACTERISTICS FOR USE BY NETWORK FUNCTION IN A SERVICE FUNCTION CHAIN

TECHNICAL FIELD

The present disclosure relates generally to communication networks, and more particularly, to network layer transport of video information for use by a network function.

BACKGROUND

Video traffic accounts for the majority of traffic passing through most networks today. The video traffic may include, for example, live or recorded content encoded and distributed to end users using a wide array of video client devices including smart phones, tablets, desktop computers, IPTV (Internet Protocol Television), and the like. As video passes through the network it is often changed into different formats.

BRIEF DESCRIPTION OF THE DRAWINGS

FIG. 5 illustrates an example of a format of a header used to transport the video information, in accordance with one embodiment.

FIG. 6 illustrates another example of a format for the header used to transport the video information, in accordance with one embodiment.

Corresponding reference characters indicate corresponding parts throughout the several views of the drawings.

DESCRIPTION OF EXAMPLE EMBODIMENTS

Overview

Figure 1:
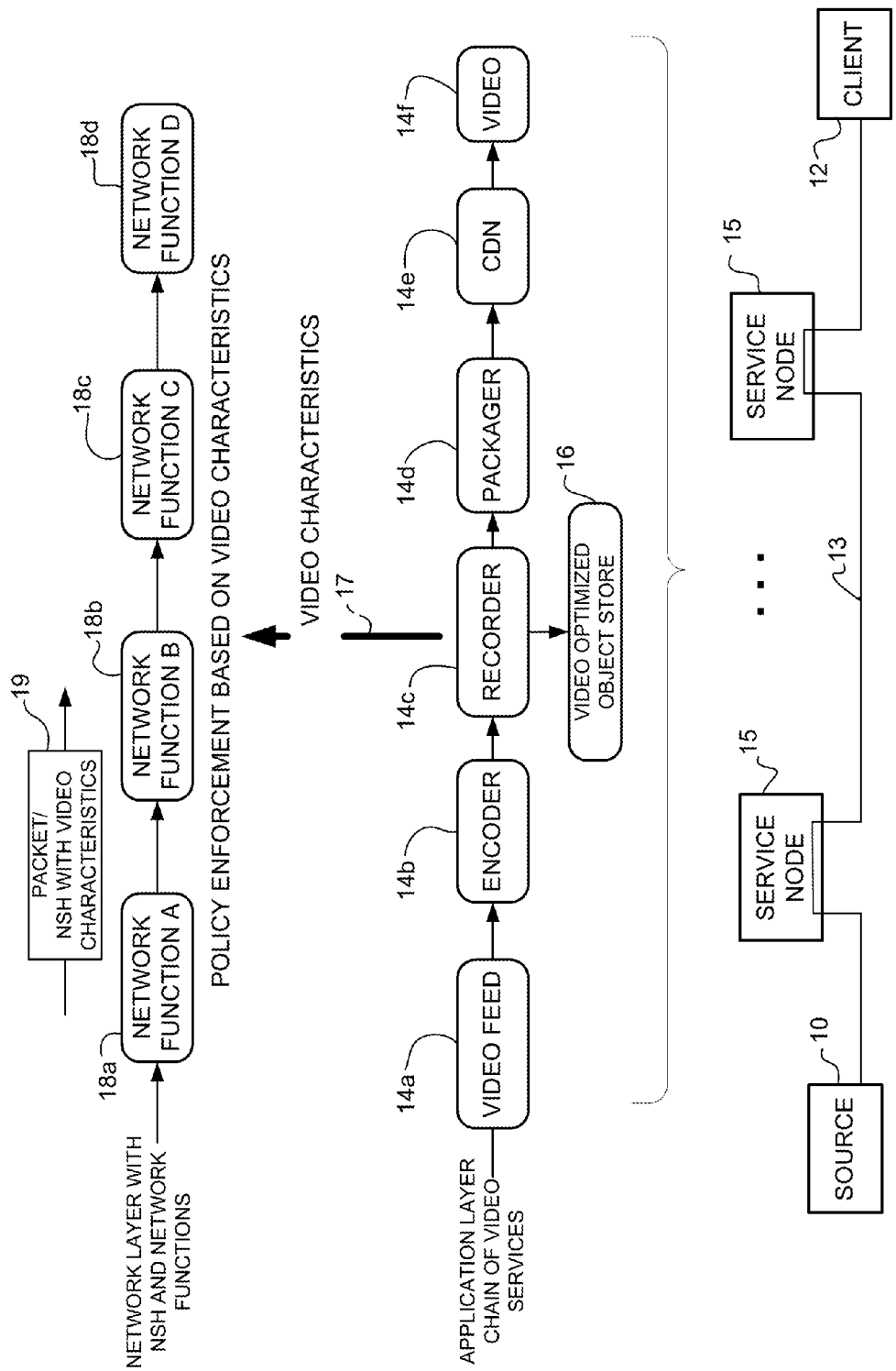
FIG. 1 illustrates an example of a network in which embodiments described herein may be implemented.

In one embodiment, a method generally comprises identifying at a network device, a characteristic of a video processed by a video service operating at an application layer, inserting the video characteristic into a header of a packet at the network device, and transmitting the packet on a service function path comprising a network function operable to use the video characteristic at a network layer.

In another embodiment, an apparatus generally comprises a plurality of interfaces for receiving and transmitting data on a service function path, a processor for processing a packet received on the service function path, the packet comprising a video characteristic inserted into a header of the packet in a chain of video services at an application layer, and performing a network function at a network layer based on the video characteristic, and memory for storing the video characteristic.

In yet another embodiment, logic is encoded on one or more non-transitory computer readable media for execution and when executed operable to identify a characteristic of a video processed at a network device comprising a video service operating at an application layer, insert the video characteristic into a header of a packet at the network device, and transmit the packet on a service function path comprising a network function operable to use the video characteristic at a network layer.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

With video traversing the network and morphing into different formats as it is prepared and distributed, it is not easy to find a parallel or association from source to playout. Thus, obtaining and correlating video related information (characteristics, attributes) (e.g., encoding, bitrate, resolution, channel identifier, and the like) in an end-to-end flow is very difficult. This may be performed manually, however, it is cumbersome and consequently unscalable. Dedicated appliances and utilities may be used to obtain video information on an exception basis when needed for adhoc (special purpose) troubleshooting. However, such troubleshooting involves expensive techniques and can be computationally or resource expensive (e.g., as with deep packet inspection (DPI) techniques) or human resource expensive with highly manual techniques (e.g., tcpdump, packet analysis, etc.) that are very time consuming, especially if needed at scale.

In one example, an encoder output stream may be constructed with multicast groups and port numbers. Each port number carries a different bitrate, however, it is not clear what it is unless looking at a document or an individual encoder setting, or running deep packet inspection. Within a network path, a video channel may be converted into HTTP (Hypertext Transfer Protocol) ABR (Adaptive Bit Rate) (e.g., MPEG (Moving Pictures Experts Group) DASH (Dynamic Adaptive Streaming over HTTP), HLS (HTTP Live Streaming), HSS (HTTP Smooth Streaming)) for recording or playout to OTT (Over-The-Top) devices. Details of the stream may be retrieved using HTTP and parsed, sometimes in multiple layers.

This lack of video information raises concerns regarding network visibility into bandwidth impacting information elements, such as encoding, bitrate, resolution, and the like. In cloud/network/OTT environments, application layer systems (e.g., V2P (Virtual to Physical)) may provide some visibility into per video bandwidth usage. However, this intelligence is not readily available at the network layer. Thus, service providers are not able to act on this information in a manner that maximizes network utilization, performance, or other areas while providing a seamless end user experience. If network functions do not have awareness of video attributes, it is difficult to apply policies such as guaranteed bandwidth or route a specific content provider video to the correct content delivery network.

The embodiments described herein expose and transport video characteristics (information, attributes) so that they can be easily consumed by a variety of network-level services. In one or more embodiments, video characteristics (e.g., low-level video attributes) are readily available at a network layer in a manner that is scalable, thus providing flexibility for providers to perform policy based aggregate and per-subscriber bandwidth enforcement with automated and proactive mitigation and remediation. One or more embodiments may also allow for automated per-subscriber differentiated treatment and quality enforcement for different classes of subscribers.

As described below, video characteristics that are available on the application layer are leveraged at the network layer. By enabling video transparency and visibility to the network layer, network functions within a Service Function Chain (SFC) are able to use this information for network monitoring, policy enforcement, automated proactive remediation of video based network issues, automated per-subscriber differentiated treatment, quality enforcement for different classes of subscribers, and other functions. In one embodiment, video characteristics are inserted into a metadata field of a Network Service Header (NSH) and optionally correlated with other relevant subscriber identifying information. This provides network layer visibility of a variety of video characteristics.

Referring now to the drawings, and first to FIG. 1, an example of a network in which embodiments described herein may be implemented is shown. The embodiments operate in the context of a data communication network including multiple network devices (components, elements, nodes). The network may include any number of network devices in communication via any number of nodes (e.g., routers, switches, gateways, controllers, edge devices, access devices, aggregation devices, core nodes, intermediate nodes, service nodes, or other network devices), which facilitate passage of data within the network. The network devices may communicate over one or more networks (e.g., local area network (LAN), metropolitan area network (MAN), wide area network (WAN), virtual private network (VPN), virtual local area network (VLAN), wireless network, enterprise network, corporate network, data center, Internet, intranet, radio access network, public switched network, or any other network). In one or more embodiments, the network operates in an SDN (Software Defined Networking)/NFV (Network Functions Virtualization) environment.

In the example shown in FIG. 1, the network includes an application layer comprising a chain of video services and a network layer comprising a plurality of network functions. The video services and network functions are applied at nodes (e.g., service node 15 or other network device) along a service function path 13 (described below). Traffic from a source 10 traverses different video applications while being modified or handled as it is transmitted to a client 12. The endpoints (source 10, client 12) may comprise any network device or combination of devices configured for receiving, transmitting, or receiving and transmitting data (content). Data flow paths between the endpoints may include any number or type of intermediate nodes (e.g., routers, switches, gateways, or other network devices). Network traffic may traverse one or more networks.

The source 10 may be capable of serving content such as video or any suitable information that can propagate in the network, to one or more receivers (e.g., client (client device), endpoint, request originator, content receiver, ABR video client, adaptive streaming client, user device) 12. The term "video" as used herein may include video, images, graphics, text, Web pages, audio, or other data or combination thereof, that can be played at the client device 12. The content transmitted from the source 10 may be encrypted, compressed, or encoded according to any format. There may be any number of sources 10 providing content to any number of clients 12. The content source 10 may be, for example, a server (e.g., origin server) or group of servers that store data locally or obtain the content from another server or media source via another network, satellite, cable, or any other communication device or system.

The client 12 may be any network device operable to request and receive content from content source 10. The client 12 may be associated with one or more devices, customers, or end users that want to receive content in the communication system. The client 12 may be wired or wireless and may include, for example, a desktop computer, laptop computer, cellular phone, smart phone, personal digital assistant (PDA), tablet, multimedia device, IPTV (Internet Protocol Television), television with communication capabilities, or any other device operable to initiate or respond to video, audio, media, or data exchanges within the communication system. The client 12 may also be a device that seeks to engage in communications on behalf of another entity or element, such as a program, database, or other component. The client device 12 may be in communication with a network path comprising one or more of the services and network functions via Wi-Fi, Ethernet, Bluetooth, radio frequency, cable, fiber optic, or other network infrastructure.

In the example shown in FIG. 1, the video services are applied to a data stream (e.g., MPEG-2 feed, h.264 feed, or other video feed) 14a and include an encoder 14b, recorder 14c, and packager 14d. The encoded stream is provided to a CDN (Content Delivery Network) 14e, which may provide video 14f (e.g., ABR (Adaptive Bit Rate) video) to the client 12. The content delivery network 14e may be operable to acquire and stream media and may include streaming applications for content delivery to digital televisions and set-top boxes, and Internet streaming applications for content delivery to IP devices such as personal computers, mobile phones, and handheld devices, for example. The recorder 14c may store optimized video as shown at node 16. For example, a live video channel may be converted for recording or playout to OTT devices. As previously noted, as the video traverses the network it may be changed into different formats. The video services may operate at one or more network devices. For example, a headend device may include the encoder 14b and recorder 14c.

Transparency of video characteristics is introduced into the network layer as depicted by arrow 17 in FIG. 1. By enabling video transparency and visibility to the network layer, network functions 18a, 18b, 18c, 18d within an SFC (Service Function Chain) may use this information for network monitoring, policy enforcement, automated and proactive remediation of video-based network issues, automated per-subscriber differentiated treatment, quality enforcement for different classes of subscribers, or any other use. Examples for use of the video characteristics by the network functions are described further below.

Video information may be defined at different stages in processing in the video pipeline of video services. For example, manifest information may be defined at the packager, however, this information may be incorporated at an earlier stage in the media pipeline. In one embodiment, details from each stage of the pipeline may be incorporated to allow the network functions to apply policies per stage and per stage information.

The network function 18a, 18b, 18c, 18d is responsible for specific treatment of received packets and operates at the network layer of the OSI (Open Systems Interconnection)

model. The network functions may operate at any number of network components (e.g. devices, elements, nodes). The network component may comprise, for example, a server, host, gateway, or any other device, element, or component operable to communicate or provide data, services, or functions within a networking environment.

The service node 15 shown in FIG. 1 may host one or more network functions 18a, 18b, 18c, 18d and have one or more network locators associated therewith for reachability and service delivery. The network function may be a virtual element (instance) or be embedded in a physical network element (device). One or more network functions may be embedded in the same network element for application to traffic passing through the node.

One or more network devices may communicate with a controller (not shown) (e.g., ODL (OpenDayLight) controller, SDN (Software-Defined Networking) controller, or other centralized server). The controller may be a physical device or a virtual element, and may be located at one network device or distributed throughout the network at different network devices in communication with one another or a central controller, for example. In one example, the SDN/SFC environment includes an external controller (e.g., ODL, etc.) that has the intelligence and flow-based rules to correlate specific sources 10 and destinations 12 with the appropriate network function 18a, 18b, 18c, 18d. This correlation may be done, for example, using flow-level (5-tuple) information (source IP address, destination IP address, port number, protocol, multicast group, etc.). The typical elements of a packet sent across a network may be used to identify the source including the IP address, port number, and multicast group, etc. The embodiments may, for example, incorporate video-specific metadata that is relevant to a source 10 and specific to a multicast group, port number, IP address, etc. (i.e., a channel from a content provider). The controller (or another network device) may include service chaining logic that defines one or more service chains, as described below.

Network services may be employed at different points in a network infrastructure, including for example, wide area network, data center, campus, and the like. The services may be applied as part of a service function chain, which is a data structure defining a set of service nodes hosting various service functions and the order in which the service functions should be applied to the data of selected traffic. Service chaining involves the interception of traffic and directing of traffic through a series of service nodes 15 (i.e., physical or virtual devices) that each support one or more service functions. A path instantiated from ingress/classifier to egress via various service functions is known as a Service Function Path (SFP) 13.

In one embodiment, video characteristics are introduced in the network layer through the use of a Network Service Header (NSH) within packet 19, which transports the video characteristics across network functions 18a, 18b, 18c, 18d to allow for policy enforcement based on video specific details (e.g., bitrate, bandwidth, resolution, channel identifier, codec, etc.). The NSH is a dataplane header that may be added to packets (i.e., packets, frames) 19 for use in service chains. The header contains information used for service chaining, as well as metadata added and consumed by network nodes and service elements. The NSH may be used across a range of devices, both physical and virtual. In one example, NSH may be implemented as described in IETF draft "Network Service Header", P. Quinn et al., Feb. 24, 2015 (draft-quinn-sfc-nsh-07.txt). The NSH may be added to packets 19 and contains information needed for service chaining, as well as metadata added and consumed by network nodes. Examples of formats and fields that may be used for insertion of the video characteristics into the NSH are described below with respect to FIGS. 5 and 6.

It is to be understood that the network shown in FIG. 1 and described above is only an example and the embodiments described herein may be implemented in networks comprising different network topologies or network devices, or using different protocols without departing from the scope of the embodiments. For example, the network service header described herein is only an example and other types of headers may be used without departing from the scope of the embodiments. Also, the network may include any number or type of network devices that facilitate passage of data over the network (e.g., routers, switches, gateways), network elements that operate as endpoints or hosts (e.g., servers, virtual machines, clients), video services, network functions, and any number of network sites in communication with any number of core networks. Moreover, the topology illustrated in FIG. 1 and described above is readily scalable and may accommodate a large number of components, as well as more complicated arrangements and configurations. Thus, network nodes (elements, devices) may be used in any suitable network topology, which may include any number of servers, virtual machines, switches, routers, appliances, controllers, gateways, or other nodes interconnected to form a large and complex network, which may include cloud or fog computing. Nodes may be coupled to other nodes or networks through one or more interfaces employing any suitable wired or wireless connection, which provides a viable pathway for electronic communication.

Figure 2:
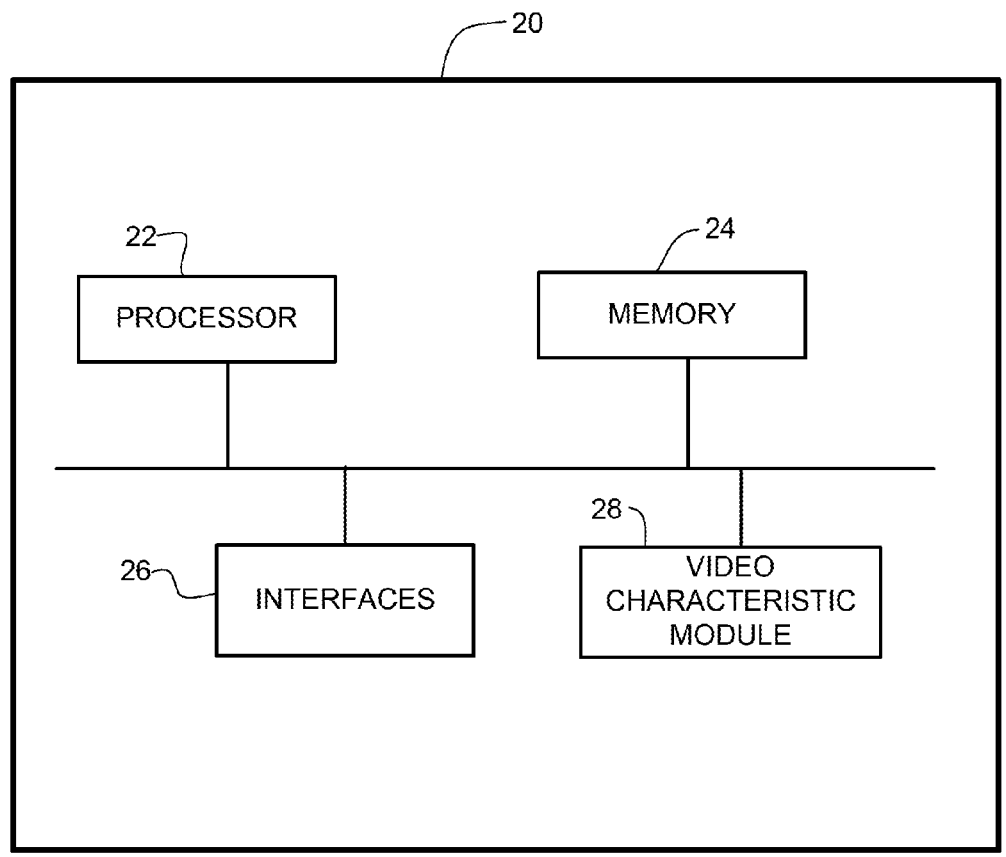
FIG. 2 depicts an example of a network device useful in implementing embodiments described herein.

FIG. 2 illustrates an example of a network device 20 (e.g., node operable to perform video services or network functions in FIG. 1) that may be used to implement the embodiments described herein. In one embodiment, the network device 20 is a programmable machine that may be implemented in hardware, software, or any combination thereof. The network device 20 includes one or more processor 22, memory 24, network interface 26, and video characteristic module 28 (e.g., video characteristic identification/insertion module, video characteristic retrieval module, video characteristic transport module).

Memory 24 may be a volatile memory or non-volatile storage, which stores various applications, operating systems, modules, and data for execution and use by the processor 22. For example, video characteristic module components (e.g., code, logic, software, firmware, etc.) may be stored in memory 24. Memory 24 may also include one or more databases (e.g., database comprising policies or storing received video characteristics). The network device 20 may include any number of memory components.

Logic may be encoded in one or more tangible media for execution by the processor 22. For example, the processor 22 may execute codes stored in a computer-readable medium such as memory 24 to perform the processes described below with respect to FIGS. 3 and 4. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device 20 may include any number of processors 22. In one example, the computer-readable medium comprises a non-transitory computer-readable medium.

The network interfaces 26 may comprise any number of interfaces (linecards, ports) for receiving data or transmitting data to other devices. For example, the network interface 26 may be configured for transmitting or receiving data packets 19 on the service function path (service function chain, service chain, service path) 13 in FIG. 1. The network interface 26 may be configured to transmit or receive data using a variety of different communication protocols. The network interface 26 may include, for example, an Ethernet interface for connection to a computer or network. The interface may include mechanical, electrical, and signaling circuitry for communicating data over physical links coupled to the network.

It is to be understood that the network device 20 shown in FIG. 2 and described above is only an example and that different configurations of network devices may be used. For example, the network device 20 may further include any suitable combination of hardware, software, processors, devices, components, modules, or elements operable to facilitate the capabilities described herein.

Figure 3:
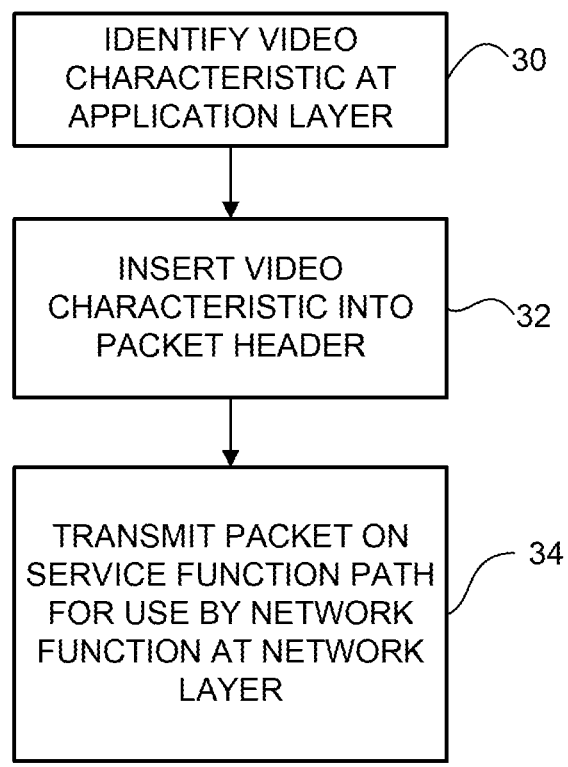
FIG. 3 is a flowchart illustrating an overview of a process for providing video information identified at an application layer to a network layer for use by a network function on a service function path, in accordance with one embodiment.

FIG. 3 is a flowchart illustrating an overview of a process for providing video information identified at an application layer to a network layer for use by a network function on a service function path, in accordance with one embodiment. At step 30, one or more characteristics of a video processed by a video service (e.g., 14b, 14c, 14d of FIG. 1) operating at an application layer are identified at a network device (e.g., network device 20 shown in FIG. 2). The video characteristic may comprise for example, bitrate, resolution, codec, bandwidth, channel ID, source, correlation information (source, destination, mobile device identifier, subscriber ID), or any other video characteristic (information, attribute) available on the application layer. The video characteristic is inserted into a header of a packet at the network device (step 32). In one embodiment, the video characteristic may be inserted into a metadata field of a Network Service Header (NSH), as described below. The packet 19 containing the video characteristic in its header is transmitted on a service function path 13 comprising one or more network functions operable to use the video characteristic at a network layer (step 34) (FIGS. 1 and 3). The video information may be incorporated at different stages of the video pipeline, thereby providing video transparency to the network/transport layer.

Figure 4:
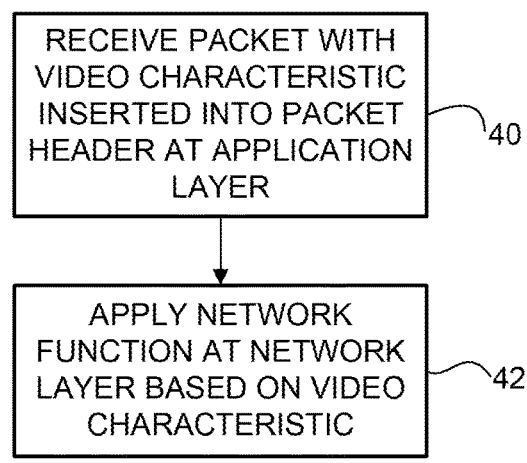
FIG. 4 is a flowchart illustrating an overview of a process for transporting the video information inserted at the application layer for use by the network function on a service function path, in accordance with one embodiment.

FIG. 4 is a flowchart illustrating an overview of a process for transporting the video information inserted at the application layer for use by the network function on the service function path, in accordance with one embodiment. At step 40, a network device receives a packet comprising one or more video characteristics inserted into a header of the packet in a chain of video services at an application layer. The network device may perform one or more network functions based on the received video characteristic (step 42). This allows network functions within the service function chain to use the video information for network monitoring, policy enforcement, remediation, per-subscriber differentiated treatment, quality enforcement for different classes of subscribers, and other functions.

It is to be understood that the processes shown in FIGS. 3 and 4, and described above are only examples and that steps may be added, deleted, combined, or modified without departing from the scope of the embodiments.

As previously noted, the embodiments may be implemented in a Network Function Virtualization (NFV)/Service Function Chain (SFC) environment. This environment allows for the exchange of metadata via the Network Service Header (NSH). In one embodiment, video characteristics may be inserted into a metadata field of a Type 1 or Type 2 NSH. The metadata used to transport the video characteristics may be fixed-length (e.g., 4-bytes) as used in NSH MD-Type 1 or variable length as used in NSH MD-Type 2.

FIG. 5 illustrates an example of a header format 50 for an NSH MD-type header. In this example, the base header specifies MD-type 1 and four context headers are added immediately following the service path header. The first line shown in FIG. 5 is the NSH base header, which includes fields for version, O bit, C bit, reserved flags, length, and MD type. The base header is followed by the service path header, which includes a service path identifier and service index. In this example, the video specific characteristics (e.g., video codec, bandwidth, etc.) may be incorporated into one or more of the mandatory context headers. If the context header carries no metadata, it is set to zero.

FIG. 6 illustrates an example of a header format 60 utilizing an NSH MD-type 2 header. When MD-type 2 is used, zero or more variable length context headers may be added immediately following the service path header. As described above with respect to FIG. 4, the NSH includes a base header and a service path header. The video information is inserted into the variable length context header (or headers) that operate as video specific fields.

As described above, the metadata may be used in an SFC (Service Function Chain) enabled environment in which the NSH header is only exchanged among architectural members of the SFC. This implies that only virtualized network functions (and SF (Service Function) classifiers and forwarders) consume a packet with an NSH header. The NSH may be removed by the last Service Function Forwarder (SFF) in the service chain or by a service function that consumes the packet. Therefore, legacy devices or network functions are not impacted by the embodiments described herein provided they are part of an SFC-enabled environment. Additionally, the NSH header should not have any impact on the video functions nor the video clients and video-enabled end-devices as these are SFC unaware.

The following snippet shows an example of manifest file information that is defined and sent for certain streams. In this example, bitrate, bandwidth, codec, and resolution information is provided. It is to be understood that this is only an example and that different or additional information may be included in the video characteristics.

--------- SNIPPET 1 ------------

EXT-X-STREAM-INF:PROGRAM-
ID=1,BANDWIDTH=385000,CODECS="avc1.674D401F966281A87B7FE0140013E
84040405000003E90000EA60940,mp4a.804C",RESOLUTION=400x224
index_Variant_385000.m3u8
EXT-X-STREAM-INF:PROGRAM-
ID=1,BANDWIDTH=595000,CODECS="avc1.674D401F966281A87B7FE0140013E
84040405000003E90000EA60940,mp4a.804C",RESOLUTION=640x368
index_Variant_595000.m3u8
EXT-X-STREAM-INF:PROGRAM-

--------- SNIPPET 1 ------------

ID=1,BANDWIDTH=964000,CODECS="avc1.674D401F966281A87B7FE0140013E
84040405000003E90000EA60940,mp4a.804C",RESOLUTION=1280x720
index_Variant_964000.m3u8
EXT-X-STREAM-INF:PROGRAM-
ID=1,BANDWIDTH=1490000,CODECS="avc1.674D401F966281A87B7FE0140013
E84040405000003E90000EA60940,mp4a.804C",RESOLUTION=1280x720
index_Variant_1490000.m3u8
EXT-X-STREAM-INF:PROGRAM-
ID=1,BANDWIDTH=2332000,CODECS="avc1.674D401F966281A87B7FE0140013
E84040405000003E90000EA60940,mp4a.804C",RESOLUTION=848x480
index_Variant_2332000.m3u8
EXT-X-STREAM-INF:PROGRAM-
ID=1,BANDWIDTH=63750,CODECS="mp4a.804C"
-------------------------------

The manifest file is defined as a hierarchical element whereby each bandwidth definition has a separate manifest file that maintains the video chunk information (see second snippet below).

--------- SNIPPET 2 ------------

EXTM3U
EXT-X-TARGETDURATION:11
EXT-X-VERSION:3
EXT-X-MEDIA-SEQUENCE:5411
EXTINF:10.01,
385000/4880175300.ts
EXTINF:10.01,
385000/4881076200.ts
EXTINF:10.01,
385000/4881977100.ts
-------------------------------

These details may be incorporated into the packet header while being correlated to other relevant information. As previously noted, video information is often defined at different stages in processing a raw stream. In the case of the manifest information above, the video characteristics may be defined at the packager, however, it may be incorporated at an earlier stage in the media pipeline. From an SFC perspective this means that details from each stage of the pipeline are incorporated and therefore allow network functions to apply policies per stage and per stage information.

The following provides different use examples that may be implemented by the embodiments described herein. It is to be understood that these are only examples, and the embodiments described herein may be implemented for other uses, without departing from the scope of the embodiments.

In a first example, uncontested bandwidth provisioning is enabled for video content delivery in a cloud headend. The headend may encompass, for example, the encoder and recorder. In addition, it assures the best possible quality for video data received from content providers. The video attribute information incorporated into the NSH in this example allows network functions to enforce policies based on the type of video (e.g., live video, on-demand, network DVR (Digital Video Recorder) recordings, etc.).

In another example, video characteristics are used in the NSH to provide policy enforcement on an aggregated bandwidth level. An on-demand and dynamic approach may be used to update policies based on overall bandwidth utilization by all video flows managed by a network. These policies may define quality of service rules to regulate priority flows or assure the least possible drop rates in case of oversubscription. Furthermore, policies may enforce a regulation of bitrates used in the overall environment to either improve or degrade video quality depending on available aggregate bandwidth. For example, during off-peak hours the subscribers receiving video may get the highest possible bitrate (and therefore the best quality video) as long as bandwidth is available at an aggregate level. As soon as the aggregate level degrades, policies may be automatically triggered to perform necessary actions to maintain a loss-free environment. These policies may be based on an SLA (Service Level Agreement) between the provider and the subscriber to ensure agreement enforcement. Actions may include dynamically modifying bitrates, or codecs, employing a different set of traffic engineering or QoS (Quality of Service) policies/configurations, or even adding additional bandwidth, etc.

In another example, video characteristics may be used to provide bandwidth enforcement on a per-subscriber level. The video characteristics within the NSH may be correlated with other relevant subscriber-identifying information (e.g., IMEI (International Mobile Equipment Identity) number, etc.) to be able to perform policy enforcement on a per-subscriber level to maintain and assure SLA agreements. This may be useful for SPs (Service Providers) who want to do automated policy enforcement for different classes of subscribers. For example, automated enforcement of high quality video for premium subscribers and potentially degraded quality for base tier subscribers, especially during peak times when network availability may be a challenge.

In yet another example, the video characteristics incorporated into the NSH may be used for troubleshooting and problem analysis purposes. Visibility of video characteristics on the network layer helps to identify problems that may cause video quality issues. This may be used to provide end-to-end visibility into video flows at an aggregate level as well as provide visualization capabilities.

As noted above, the video information may optionally be correlated with other relevant subscriber-identifying information, such as subscriber identifier (ID), IMEI numbers, etc. This provides network-layer visibility for a variety of video characteristics. Correlation of the video characteristics may be used, for example, to distinguish different video flows coming from the same source to enable fine-grained policy enforcement. Correlation details themselves (e.g., source, destination, mobile device identifiers, subscriber IDs, etc.) may be carried in the NSH metadata along with the video coding attributes so that information can be easily consumed by a variety of network-level services that may use this information.

In one or more embodiments, cloud classifiers may be used to further classify sources based on their origination of cloud environments. Cloud classifiers enable isolation based on cloud provider, service IDs, and tenant IDs. A video stream sourced from a specific service running on a cloud may be identified using the cloud classifiers. Through use of these additional classifiers, close correlation to the video characteristics may be provided to distinguish different video flows coming from the same source to enable fine-grained policy enforcement.

Consumption of the video-relevant information that is incorporated into the metadata field of an NSH header is optional. The information may be used by any service function that is part of a service function chain. The video-relevant information may be consumed by any number of network functions that benefit from this data for video-aware policy enforcement, scalable video troubleshooting, visualization of video-relevant, and encoding-specific content/traffic and its impact at a network layer, etc. It is to be understood that uses of the video information described herein are only examples and that the video information may be used for other purposes, without departing from the scope of the embodiments.

As can be observed from the foregoing, the embodiments described herein provide numerous improvements. For example, the ability to correlate a single video stream end-to-end, across multiple manipulation points (e.g., from UDP (User Datagram Protocol) multicast to HTTP ABR delivery) is less costly and quicker than utilizing technologies such as deep packet inspection, or by having to manually inspect the stream at various locations in the network. This may provide Service Providers (SPs) the ability to easily monitor and visualize their video data, and in turn may help them in multi-tenant situations such as billing. One or more embodiments may provide flexibility for providers to do policy-based aggregate and per-subscriber bandwidth enforcement with automated and proactive mitigation or remediation. Also, low-level video attributes may be made readily available at a network layer in a manner that is scalable. One or more embodiments allow automated per-subscriber differentiated treatment and quality enforcement for different classes of subscribers.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   identifying at a network device comprising a processor, a video characteristic of a video processed by a video service operating at an application layer, the application layer comprising a chain of video services operating at network devices, said video characteristic comprising video attributes available at the application layer and not readily available at the network layer;
   processing a packet at the processor to insert said video characteristic into a header of the packet at the network device to provide network layer visibility of said video characteristic available at the application layer; and
   transmitting the packet by the processor at the network device, on a service function path comprising a network function, wherein the network function uses said video characteristic at a network layer, the video services and the network functions applied at service nodes and the network devices in the service function path;
   wherein the header comprises a Network Service Header (NSH) and said video characteristic is inserted into the NSH to provide said network layer visibility of said video characteristic available at the application layer, said video characteristic comprising information for use in network monitoring or policy enforcement by the network function at the network layer.

2. The method of claim 1 wherein said video characteristic comprises video coding attributes and correlation information for the video coding attributes.

3. The method of claim 1 wherein said video characteristic comprises a channel identifier for the video.

4. The method of claim 1 wherein said video characteristic is for use in remediation of a video-based network issue by the network function at the network layer.

5. The method of claim 1 wherein said video characteristic is for use in per-subscriber differentiated treatment for different classes of users of the video by the network function at the network layer.

6. An apparatus comprising:
   a plurality of ports configured to receive and transmit data on a service function path;
   a processor for processing a packet received on the service function path, the packet comprising a video characteristic inserted into a header of the packet in a chain of video services at an application layer, and performing a network function at a network layer based on said video characteristic, wherein said video characteristic comprises video attributes available at the application layer and not readily available at the network layer; and
   memory for storing said video characteristic for use by the processor in performing the network function;
   wherein the application layer comprises a chain of video services operating at network devices, the characteristic comprising a video characteristic available on the application layer, the network layer comprises a plurality of network functions, and the video services and network functions are applied at service nodes and the network devices in the service function path, and wherein said video characteristic comprises information for use in network monitoring and policy enforcement by the network function at the network layer; and
   wherein the header comprises a Network Service Header (NSH) and said video characteristic is inserted into the NSH to provide said network layer visibility of said video characteristic available at the application layer, said video characteristic comprising information for use in network monitoring or policy enforcement by the network function at the network layer.

7. The apparatus of claim 6 wherein the processor is operable to perform the network function for a stage of a video pipeline corresponding to the stage of the video pipeline in which the video characteristic was inserted into the packet.

8. The apparatus of claim 6 wherein said video characteristic comprises video coding attributes and correlation information for the video coding attributes.

9. The apparatus of claim 6 wherein said video characteristic comprises a channel identifier.

10. The apparatus of claim 6 wherein the network function is operable to use said video characteristic in remediation of a video-based network issue.

11. The apparatus of claim 6 wherein the network function is operable to use said video characteristic in per-subscriber differentiated treatment for different classes of users of the video.

12. One or more non-transitory computer readable media encoding logic for execution and when executed by a processor, the processor operable to:
   identify a characteristic of a video processed at a network device comprising a video service operating at an application layer, the application layer comprising a chain of video services operation at network devices, said video characteristic comprising video attributes available at the application layer and not readily available at the network layer;
   insert said video characteristic into a header of a packet at the network device to provide network layer visibility of said video characteristic available at the application layer; and
   transmit the packet on a service function path comprising a network function operable to use the video characteristic at a network layer, the video services and the network functions applied at service nodes and the network devices in the service function path;
   wherein the header comprises a Network Service Header (NSH) and said video characteristic is inserted into the NSH to provide said network layer visibility of said video characteristic available at the application layer, video characteristic comprises video attributes and information for use in network monitoring or policy enforcement by the network function at the network layer.

13. The logic of claim 12 wherein said video characteristic is correlated with subscriber identifying information.

14. The logic of claim 12 wherein said video characteristic comprises video coding attributes and correlation information for the video coding attributes.

15. The logic of claim 12 wherein the network function is operable to use said video characteristic in remediation of a video-based network issue.

16. The logic of claim 12 wherein the network function is operable to use said video characteristic in per-subscriber differentiated treatment for different classes of users of the video.

17. The logic of claim 12 wherein the processor is operable to perform the network function for a stage of a video pipeline corresponding to the stage of the video pipeline in which the video characteristic was inserted into the packet.

18. The logic of claim 12 wherein said video characteristic comprises a channel identifier.

* * * * *